Nov. 28, 1950     F. E. FISCHER     2,531,417
FOIL MEASURING SYSTEM WITH MAGNETIC BRAKE

Filed Feb. 2, 1946     2 Sheets—Sheet 1

INVENTOR
FRIEDRICH E. FISCHER
BY
ATTORNEYS

Patented Nov. 28, 1950

2,531,417

UNITED STATES PATENT OFFICE 2,531,417

FOIL MEASURING SYSTEM WITH MAGNETIC BRAKE

Friedrich Ernst Fischer, Zurich, Switzerland

Application February 2, 1946, Serial No. 645,167
In Switzerland February 9, 1945

2 Claims. (Cl. 171—95)

In measuring technics systems are often applied in which a thin metal leaf or foil describes an excursion from its position of repose under the influence of electrical or mechanical forces. In order to prevent protracted oscillation of the metal foil or leaf round the new position induced by these forces, the movement of the foil must be attenuated, and this can be done in several ways. A favourite method of braking consists in introducing the metal foil into a magnetic field whereby vorticose currents are produced in the foil when the latter moves. The loss of energy entailed by these vorticose currents has the effect of attenuating the movement. The magnetic field necessary for this purpose has hitherto been produced, as a rule, by horseshoe magnets either of the permanent type or fitted with live magnetizing coils. It is extremely difficult with an arrangement of this kind to achieve an adequate braking effect, especially when apart from the demagnetic attenuation no other resistance to the movement is present, such as, for example, that caused by the air. This applies to measuring systems which function in a vacuum. The vorticose currents produced by an ordinary horseshoe magnet in the measuring foil are not sufficient with such an arrangement to achieve an adequate braking effect on the foil.

The present invention relates to a measuring system with a moving and magnetically braked metal measuring leaf, in which by reason of the special design of the braking magnet and appropriate steerage of the measuring leaf fully adequate attenuation of the movement of the measuring leaf is achieved. The invention is characterized in that the braking magnet is designed as a symmetrical four-pole magnet with poles pointing inwards and arranged alternately, and that the measuring leaf is arranged in vertical position in the space between the poles so that all its parts in repose and during movement lie perpendicular to a symmetrical plane passing through the longitudinal axis of the magnet and two opposite poles of the magnet.

In Figs. 1–8 the basic idea of the invention and a number of technical uses are exemplified in detail.

Figure 1:
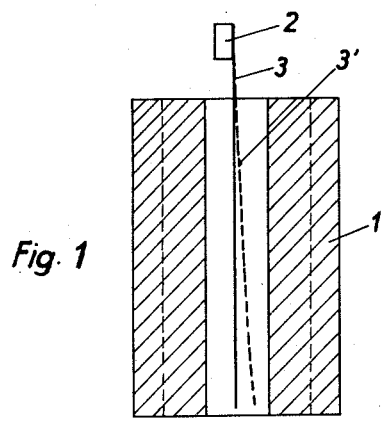
Figure 2:
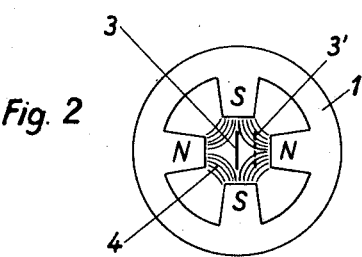

Fig. 1 shows the longitudinal section and Fig. 2 the play of a measuring system consisting of a permanent magnet and a suspended foil according to the present invention.

Figure 3:
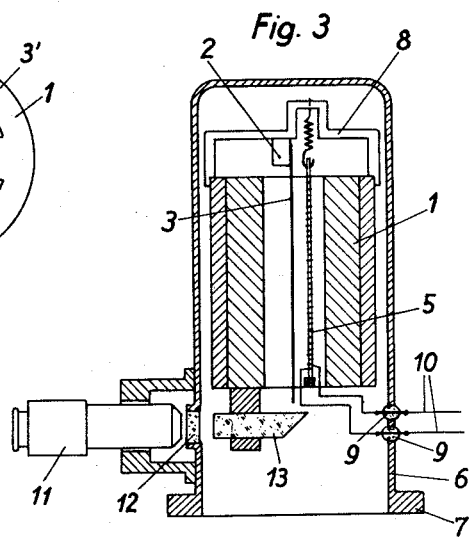
Figure 4:
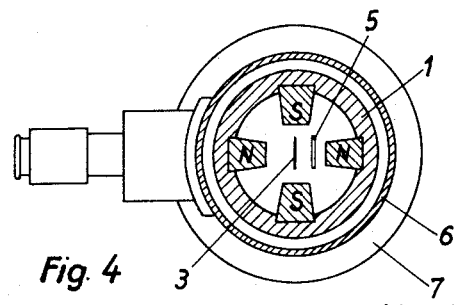
Figure 5:
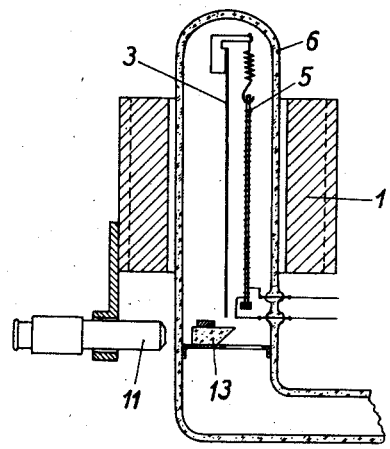
Figure 6:
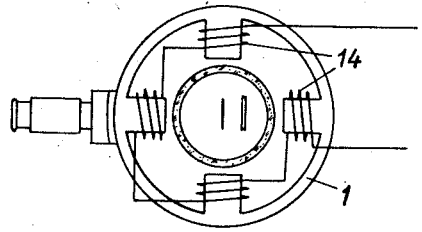
Figure 7:
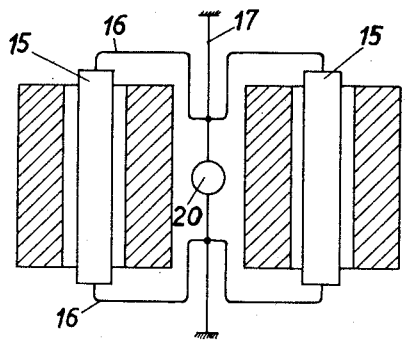

Fig. 3 shows the longitudinal section and Fig. 4 the plan of a Knudsen vacuum meter fitted with a measuring system of this type. In Figs. 5 and 6 a further embodiment of this vacuum meter is shown. Finally, Fig. 7 represents the elevation and Fig. 8 the plan of an electrostatic measuring instrument, the mobile measuring system of which is according to the invention braked with four-pole magnets.

In Figs. 1 and 2, I represents a permanent magnet the four inwardly-directed poles of which can be magnetized alternately, as indicated in Fig. 2 by the letters S (south pole) and N (north pole) inscribed on the poles. Perpendicular to the plane formed by the longitudinal axis and the two north poles of the magnet, thin metal foil 3 is suspended from metal block 2. When the metal foil makes an excursion from marked position 3 of repose to position 3' represented by the dotted line, all parts of the foil retain their perpendicular position to this plane. This has the effect that when the foil moves the maximum variation of the flow of magnetic force through the foil is achieved, thus producing the highest degree of vorticose currents and therefore of braking effect. In order to illustrate this more clearly lines of magnetic force 4, which run from the north poles to the south poles, are marked in Fig. 2. In the central position of repose the flow of magnetic forces through the foils is nil. When the foil moves to left or right the magnetic flow through the foil rapidly increases, causing the formation of intense vorticose currents as mentioned above. So great a change in the flow of magnetic forces can only be achieved by designing the braking magnet as in the present invention. If, as in former practice, a simple horseshoe magnet is used instead of braking magnet I, the same change in the flow of magnetic forces through the foil during movement can never be attained and an equal braking effect is therefore also precluded.

One advantageous use of the measuring system just described is to be found in the construction of a Knudsen vacuum meter according to Figs. 3 and 4. In both these figures the parts of the measuring system which have already been shown in Figs. 1 and 2 are marked with the same numbers. The measuring system is also provided with electrically heated plate 5 placed opposite metal foil 3. The whole is housed in air-tight casing 6 which can be screwed by means of flange 7 to an air-tight vessel. Both metal-block 2 and heating plate 5 are fastened to bar 8. Electric conductors 10 are led through insulators 9 to the heating plate. It is well known that with an arrangement of this type metal foil 3 describes an excursion due to the impact of the gas molecules which is dependent upon the degree of vacuum.

The excursion made by the foil is observed and measured by means of microscope 11 through air-tight window 12 and prism 13. Owing to the adequate braking effect on the foil exercised by the multi-pole braking magnet, the foil moves upon modification of the vacuum extremely rapidly and without oscillation from one position to another, so that even rapid fluctuations in the vacuum, such as occur in the case of escaping gas, can be pursued in all detail. With the former types of such vacuum meters, in which the braking effect on the foil was inadequate, it was not possible to measure exactly the excursion made by the foil as it was in a state of constant oscillation. This oscillation was not only caused by changes in the vacuum but also by mechanical shocks in the vacuum meter.

Figs. 5 and 6 show a slightly modified form of the Knudsen vacuum meter as compared with Figs. 3 and 4. Here again the parts which are included in the preceding figures are marked with the same numbers. In this embodiment braking magnet 1 is arranged outside air-tight casing 6. It is moreover not designed as a permanent magnet but for the purpose of activating the magnetic flow its poles are fitted with live coils 14. In casing 6, which may be made of glass, measuring foils 3 and heating plate 5 are housed. The excursion is here again observed by means of microscope 11 through prism 13.

Figure 8:
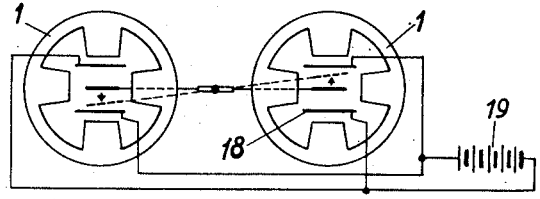

In the case of the electrostatic measuring instrument represented in Figs. 7 and 8 two measuring leaves 15 are suspended by means of bars 16 to torsion thread 17. Both measuring leaves are enclosed by braking magnet 1. The action of the magnetic force on the measuring leaves is in this case derived from electrically charged plates 18. The charging of these plates can be effected in the usual way from electric main 19. If the potential to be measured is applied to the measuring leaves, the two move in opposite directions, as indicated by the arrows, and thus turn torsion thread 17. The degree of torsion can be measured in the usual way by observation with the aid of a telescope and scale via mirror 20. The adequate attenuation of the movement of measuring leaves 15 caused by magnets 1 also has a favourable effect in this arrangement, as the duration of oscillation of this type of measuring system is very great, and were the braking effect insufficient, it would take a long time for the measuring system to come to rest.

I claim:

1. A magnetically braked measuring instrument comprising a movable metallic leaf, and at least one damping magnet having four inwardly directed poles, the poles being arranged symmetrically so that like poles are diametrically opposite each other, the leaf being arranged between and extending parallel to the faces of an opposite pair of poles and being mounted for translatory movement in a direction substantially perpendicular to such pole faces.

2. A magnetically braked measuring instrument comprising a movable metallic leaf and at least one damping magnet having four poles lying in substantially the same plane and radially disposed with respect to a common center, the poles being arranged symmetrically so that like poles are diametrically opposite each other, the leaf being arranged between and extending parallel to the faces of an opposite pair of poles and being mounted for movement in a direction substantially perpendicular to such pole faces.

FRIEDRICH ERNST FISCHER.

REFERENCES CITED

The following references are of record in the file of this patent:

UNITED STATES PATENTS

| Number | Name | Date |
| --- | --- | --- |
| 2,353,617 | Lamb | July 11, 1944 |